United States Patent [19]

Kopec et al.

[11] 3,875,348

[45] Apr. 1, 1975

[54] COMMON AUDIBLE SIGNALING CIRCUIT

[75] Inventors: Thomas J. Kopec, Arlington Heights; Richard A. Morstadt, Elmhurst, both of Ill.

[73] Assignee: GTE Automatic Electric Laboratories Incorporated, Northlake, Ill.

[22] Filed: Oct. 23, 1973

[21] Appl. No.: 408,762

[52] U.S. Cl. .............................. 179/84 R, 179/84 L

[51] Int. Cl. ........................................... H04m 1/00

[58] Field of Search ........ 179/84 R, 84 L, 81 C, 99, 179/27 FH, 84 VF, 18 HB

[56] References Cited

UNITED STATES PATENTS 3,406,262 10/1968 Grandstaff ...................... 179/84 R

*Primary Examiner*—Kathleen H. Claffy
*Assistant Examiner*—Joseph Popek
*Attorney, Agent, or Firm*—Robert J. Black

[57] ABSTRACT

An improved signaling circuit for use in telephone subsets, which provides an audible tone signal in response to incoming high voltage ringing signals appearing on any one or more of a multiplicity of telephone lines. The circuitry provides a timed burst of tone which is adjustable in volume and frequency. The volume, frequency and duration of the audible signal are independent of normal variations of the amplitude and frequency of the incoming ringing signal.

6 Claims, 1 Drawing Figure

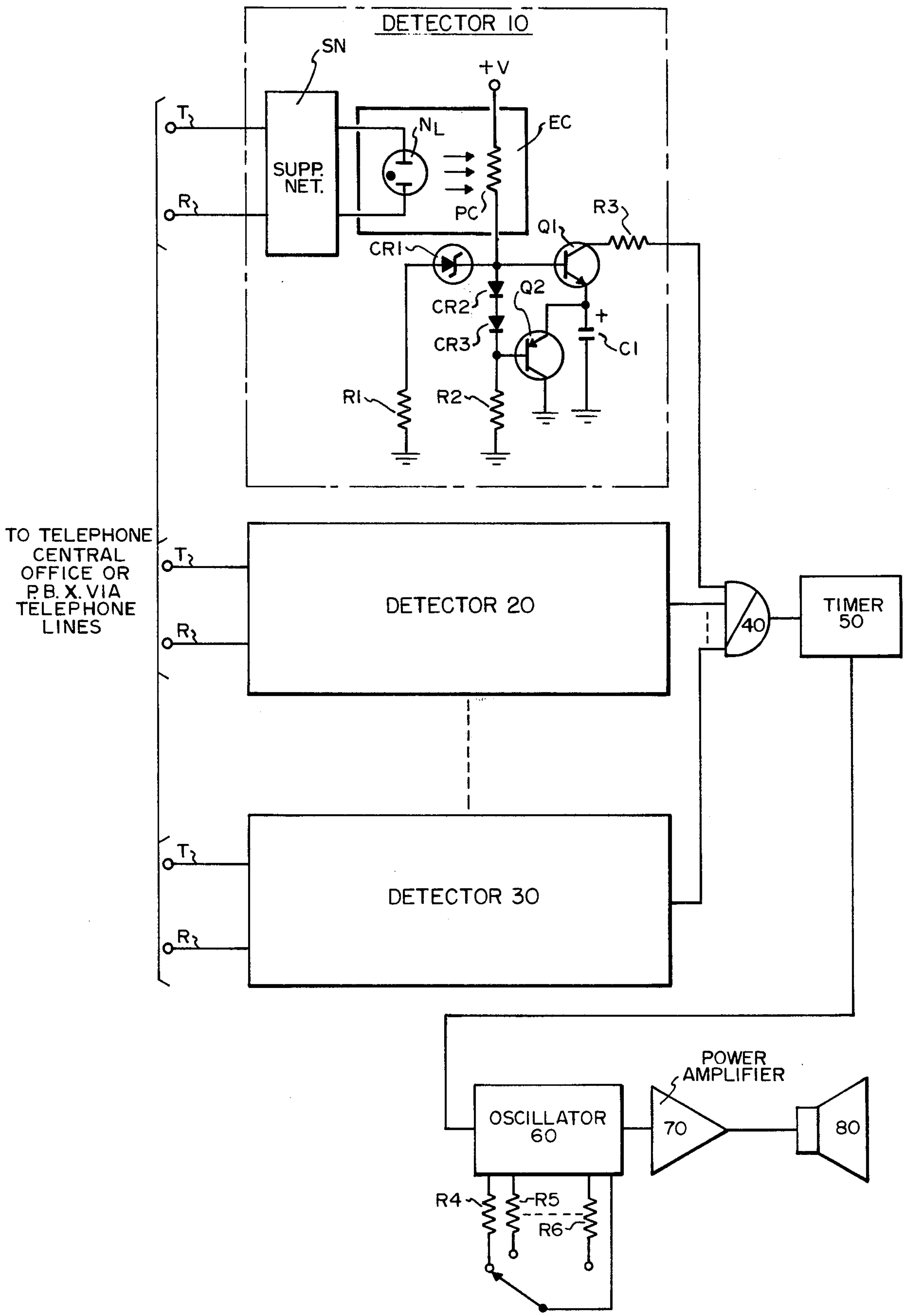
DETECTOR 10
SN
+V
T
R
SUPP. NET.
NL
EC
PC
R3
Q1
CR1
CR2
Q2
CR3
C1
R1
R2
TO TELEPHONE CENTRAL OFFICE OR P.B.X. VIA TELEPHONE LINES
DETECTOR 20
40
TIMER 50
DETECTOR 30
POWER AMPLIFIER
OSCILLATOR 60
70
80
R4
R5
R6

COMMON AUDIBLE SIGNALING CIRCUIT

BACKGROUND OF THE INVENTION

Field of the Invention

This invention relates to telephone systems and more particularly to a signaling arrangement for use in a telephone subscriber's subset which is connected to a multiplicity of telephone lines.

Description of the Prior Art

It is desirable to be able to monitor at a single location, for example, a secretary's desk, the presence of ringing signal appearing on any one of a multiplicity of telephone lines. This permits a single attendant to answer calls intended for any of a number of parties. In addition, it is desirable from a space and cost standpoint, to be able to indicate the presence of ringing signal on any one or more of a multiplicity of telephone lines using a single signaling device common to all of the lines.

The single common signaling device must maintain isolation between lines. It must be sufficiently sensitive to detect relatively low level ringing signals and it must not draw an excessive amount of power from the telephone networks.

One approach to implementing the common signaling circuit provides, for each line terminated in the subset, a cold-cathode triode connected in common to a buzzer which sounds whenever one or more of the lines are signaled by ringing.

The cathodes are connected individually to the line conductor on which the ringing signal is received. The main anodes are connected in parallel to earth ground through a current-limiting R/C network and a buzzer. The circuit thus presents a polarized load, responding to only negative potentials with respect to ground. The cold-cathode triode tubes serve to connect the ringing signal from one or more of the lines to the buzzer and to isolate the lines except during ringing. This circuit draws a relatively excessive amount of unipolar current from the line and in cases where several of these circuits are connected to a line, enough current will be drawn during ringing to falsely actuate the ring trip relay. Also, this circuit must be connected to that side of the line which is connected to the ringing generator.

Another approach to implementing the common signaling circuit provides a neon lamp, series resistor and suppression network across each line. A multiplicity of neon lamps, one per line, and a photocell are mounted in a housing which is sealed to prevent ambient light from entering. When a ringing signal appears on one or more of the lines, the associated neon lamps will light, illuminating the photocell and causing its resistance to drop in value. The photocell is connected to a detector-oscillator circuit such that when the photocell resistance drops below a predetermined value, the oscillator is enabled and generates an audible tone. When the ringing signal is removed, the neon lamp will be off and the photocell resistance will rise. After the photocell resistance has increased to a level above the predetermined value, the detector circuit prevents the oscillator from operating, thereby removing the audible tone.

This approach provides good isolation between telephone lines and draws very little current from the telephone network. However, because of the operating characteristics of the photocell, the circuit does not give reliable response to ringing signals. Many photocells, after having been in darkness for several days, achieve a very high resistance and require a long time exposure to the light from the neon lamps to reduce their resistance to the threshold level. This results in a delayed response to the ringing signal. Also, many photocells, after achieving a low resistance in response to the light from the neon lamps, will increase in resistance slowly upon the removal of the ringing signal, causing the audible response to remain during part or all of the quiet period of the ringing cycle. Since the photocell operating characteristics vary considerably from unit to unit, the performance of this form of common audible signaling circuit varies from circuit to circuit.

The present invention discloses a common signaling circuit which uses a neon lamp-photocell combination to detect the ringing signal, but is not limited in performance by the variable operating characteristics of the photocell. Consequently, the circuit of the present invention responds faster and more reliably to ringing signals.

Summary of the Invention

The common signaling circuit of the present invention uses a photocell as part of a voltage divider network. When the photocell is illuminated by a neon lamp in response to a ringing signal, its resistance decreases causing the voltage at the output of the divider to rise. This increasing voltage causes a first transistor switch to operate and causes the voltage applied to a capacitor memory to increase along with the increasing voltage of the voltage divider. When the ringing signal is removed, the photocell resistance increases causing the voltage at the output of the divider to drop. This decreasing voltage allows a second transistor switch to turn on, discharging the capacitor memory to a voltage close to the decreasing voltage at the output of the divider. This action permits the first transistor switch to turn on whenever the photocell resistance decreases (from its present value) by an amount sufficient to cause a small voltage rise at the output of the divider.

The output of the first transistor switch is used to trigger a timing circuit via an OR gate. Activation of the timing circuit permits an audio oscillator to operate for the duration of the timing circuit. The frequency determining structure of the oscillator can be altered by the external application of suitable components, thereby providing a choice of frequencies. The output signal of the oscillator is applied to a power amplifier stage whose output is connected to a small dynamic or electromagnetic transducer, which serves as the audible signaling device.

Brief Description of the Drawing

FIG. 1 is a combined block and schematic circuit diagram of a common audible signaling device for use in a telephone subset in accordance with the present invention.

Description of the Preferred Embodiment

Referring to the single sheet of accompanying drawings, there is shown in schematic form a common audible signaling circuit including a detector 10 for use in a telephone subset in accordance with the present invention. Also shown in block form are additional detectors 20 and 30 representative of additional detectors coupled to telephone lines served by the same telephone subset.

Initially incoming ringing signals received from the telephone central office, over the telephone line are presented to terminal T and R where they are coupled through a suppression network of conventional design, to a neon lamp NL enclosed in a container EC which is sealed to prevent ambient light from entering. A quantity of neon lamps each connected to a different telephone line may be enclosed in the same container. Also included in the sealed container is a photocell PC of the photo resistive type.

The photocell PC forms one leg of a voltage divider network, the other leg being made up of the series combination of signal diodes CR2 and CR3, and resistor R2 in parallel with the series combination of zener diode CR1 and resistor R1. Incoming ringing signals received over the telephone line will cause the associated neon lamp NL to light and illuminate the photocell PC. The photocell resistance drops causing the voltage at the base of transistor Q1 to rise. When the voltage at the base of the transistor Q1 rises such that the base is sufficiently more positive than the emitter of transistor Q1, as determined by the charge on capacitor C1, then transistor Q1 turns on and capacitor C1 charges more positive. A negative going pulse is then presented to the OR gate 40, through resistor R3.

When the incoming ringing signal is no longer present, the neon lamp NL, is no longer illuminated and the photocell PC, resistance increases, the voltage at the base of transistor Q1 drops and transistor Q1 turns off. Because of the potential difference between the base of transistor Q1 and the base of transistor Q2, as determined by diodes CR2 and CR3 and the charge remaining on capacitor C1, transistor Q2 turns on when the voltage at the base of transistor Q1 drops by a small amount. Capacitor C1 can then discharge through transistor Q2. This action permits the charge on capacitor C1 to "track" the divider voltage so that only a small voltage rise at the base of transistor Q1 (which is a small drop in the photocell resistance) is needed to turn transistor Q1 on and operate the timer and oscillator circuitry.

Zener diode CR1 and resistor R1 provide a compensating effect on the voltage divider action, so that circuit operation results from a small change of photocell resistance throughout its normal resistance range.

The output of transistor Q1 is supplied to an OR gate 40 which triggers a timer 50 of conventional design. This timer permits the oscillator 60 to operate for a predetermined period after which the oscillator 60 is inhibited.

The oscillator 60 is an R/C type of conventional design. The present embodiment provides additional resistors, R4, R5, R6, etc., which may be used to alter the frequency determining structure of the oscillator 60. This feature permits a choice of several different frequencies.

The output signal of the oscillator 60 is amplified by the power amplifier 70, which is also conventional in design. The output of the power amplifier 70 is applied to a miniature loudspeaker or similar transducer 80 for reproducing the tone signals utilized to advise an attendant of incoming ringing signals at an associated telephone subset.

While but a single embodiment of the present invention has been shown it will be obvious to those skilled in the art that numerous modifications and variations may be made without departing from the spirit and scope of the present invention, which shall be limited only by the claims appended hereto.

What is claimed is:

1. Common audible signaling means for indicating the presence of incoming ringing signals on at least one of a plurality of associated communication lines, said means comprising: a plurality of detectors each including, a light emitting source connected to a different one of said communication lines and operated in response to the presence of ringing signals on said connected line, switching means, and voltage divider means connected across a voltage source including a circuit connection to said switching means and a two legs, one of said legs including fixed resistive elements and the other of said legs including light sensitive element operated in response to light from said light emitting source, and a center tap connected to the input of said switching means; a source of audible signals; gating means connected between said audible signal source and to the output of each of said detector switching means, operated in response to operation of at least one of said switching means to operate said signal source; and a signal transducer connected to said signal source operated in response to said operated signal source to audibly reproduce signals from said source.

2. Common audible signaling means as claimed in claim 1 wherein: there is further included timing means connected between said gating means and said signal source operated in response to said gating means to periodically enable said signal source.

3. Common audible signaling means as claimed in claim 1 wherein: there is further included amplifier means connected between said signal source and said transducer operated to amplify signals from said signal source and connect said amplified signals to said transducer for reproduction by said transducer.

4. Common audible signaling means as claimed in claim 1 wherein: said audible signal source further includes a plurality of signal frequency selection means, one of which is selectively operated to determine the frequency of signals from said signal source.

5. Common audible signaling means as claimed in claim 1 wherein: said light emitting source comprises a neon lamp and said light sensitive element comprises a photo sensitive resistor.

6. Common audible signaling means as claimed in claim 1 wherein: said light sensitive element comprises a photo sensitive resistor.

* * * * *